US012693487B2

(12) United States Patent
Langman et al.

(10) Patent No.: US 12,693,487 B2
(45) Date of Patent: Jul. 28, 2026

(54) NODE HARNESS FEED-THROUGH CONNECTOR CONFIGURED TO ENHANCE CONNECTION OF A FIBER OPTIC CABLE TO A CABINET

(71) Applicant: PPC BROADBAND, INC., East Syracuse, NY (US)

(72) Inventors: Michael Langman, East Syracuse, NY (US); Mitch Fredenburg, East Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 188 days.

(21) Appl. No.: 18/240,755

(22) Filed: Aug. 31, 2023

(65) Prior Publication Data

US 2024/0069298 A1 Feb. 29, 2024

Related U.S. Application Data

(60) Provisional application No. 63/374,161, filed on Aug. 31, 2022.

(51) Int. Cl.
*G02B 6/44* (2006.01)
*G02B 6/38* (2006.01)

(52) U.S. Cl.
CPC ....... *G02B 6/44775* (2023.05); *G02B 6/3894* (2013.01); *G02B 6/4478* (2013.01)

(58) Field of Classification Search
CPC . G02B 6/3894; G02B 6/4478; G02B 6/44775
See application file for complete search history.

(56) References Cited

U.S. PATENT DOCUMENTS

| | | | |
|---|---|---|---|
| 2013/0188912 A1* | 7/2013 | Bimboese | G02B 6/4285 |
| | | | 385/60 |
| 2014/0099061 A1 | 4/2014 | Isenhour et al. | |
| 2020/0073059 A1 | 3/2020 | Takeuchi et al. | |

OTHER PUBLICATIONS

International Search Report and Written Opinion dated Dec. 20, 2023 in corresponding International Application No. PCT/US2023/031688, 10 pages.

* cited by examiner

*Primary Examiner* — John Bedtelyon
(74) *Attorney, Agent, or Firm* — MH2 TECHNOLOGY LAW GROUP LLP; Stuart I. Smith

(57) ABSTRACT

A connector for connecting a cable to a cabinet in a manner that enhances feeding of a fiber through the connector includes first and second portions. The first portion is configured to be rotatably coupled with the second portion; passageways in the first and second portions are configured to be positioned at a first angle relative to each other in a first position and at a second angle relative to each other in a second position; the first and second angles are different angles; the passageways in the first position are configured so as to enhance feeding of the fiber of the cable through the connector for connection of the cable to a cabinet; and the first portion is configured to be secured to the second portion in the first position so as to enhance feeding of the fiber through the connector for connection of the cable to the cabinet.

31 Claims, 8 Drawing Sheets

NODE HARNESS FEED-THROUGH CONNECTOR CONFIGURED TO ENHANCE CONNECTION OF A FIBER OPTIC CABLE TO A CABINET

CROSS-REFERENCE TO RELATED APPLICATION

This application claims the benefit of U.S. Provisional Application No. 63/374,161 filed Aug. 31, 2022, the disclosure of which is hereby incorporated by reference herein in its entirety.

BACKGROUND

The present invention relates generally to optical fiber cable management. More particularly, the present invention relates to a connector for connecting an optical fiber cable to a cabinet and that redirects the cable at ninety degrees.

It can be difficult to feed the optical fibers of a fiber optic cable through a conventional ninety-degree connector due to, for example, difficulty in feeding the optical fibers into one opening of the connector, bending the optical fibers ninety degrees, and feeding the optical fibers out of the other opening of the connector.

It may be desirable to provide a ninety-degree connector for connecting a fiber optic cable to a cabinet that enhances feeding of optical fibers of the fiber optic cable through the connector so as to enhance connection of the fiber optic cable to a cabinet.

SUMMARY

The present disclosure provides a connector that simplifies connection of a fiber optic cable/harness to a cabinet. In particular, embodiments simplify the feeding of optical fibers of the cable/harness through the connector that connects the cable/harness to the cabinet by providing a connector that rotates between a straight position and an angled (for example, ninety-degree) position.

Embodiments provide a connector for connecting a fiber optic cable having an optical fiber to a cabinet in a manner that enhances feeding of the optical fiber through the connector, including: a cabinet-side body portion; and a cable-side body portion. The cabinet-side body portion may comprise a cabinet-side swivel portion; the cable-side body portion may comprise a cable-side swivel portion; the cable-side swivel portion may be structurally configured to be rotatingly coupled with the cabinet-side swivel portion such that the cable-side body portion may be structurally configured to rotate relative to the cabinet-side body portion between a cable installation position and an angled position; a passageway in the cabinet-side body portion and a passageway in the cable-side body portion may be structurally configured to be positioned at a first angle relative to each other in the cable installation position; the passageway in the cabinet-side body portion and the passageway in the cable-side body portion may be structurally configured to be positioned at a second angle relative to each other in the angled position; the first angle and the second angle may be different angles; a securing mechanism may be structurally configured to selectively secure the cable-side body portion to the cabinet-side body portion in the cable installation position and in the angled position; and the securing mechanism may be structurally configured to secure the cable-side body portion to the cabinet-side body portion in the cable installation position so as to enhance feeding of optical fibers of the fiber optic cable through the connector for connection of the fiber optic cable to a cabinet.

In particular embodiments, the cable-side body portion and the cabinet-side body portion may be structurally configured such that a longitudinal axis of the passageway in the cabinet-side body portion and a longitudinal axis of the passageway in the cable-side body portion are parallel in the cable installation position.

In particular embodiments, the second angle may be ninety degrees.

In particular embodiments, the cabinet-side body portion may comprise a cabinet connection portion that may be structurally configured to connect to a cabinet.

In particular embodiments, the cable-side body portion may comprise a cable connection portion that may be structurally configured to connect to a cable.

In particular embodiments, the passageway in the cabinet-side body portion may extend through the cabinet-side body portion, and the passageway in the cable-side body portion may extend through the cable-side body portion.

In particular embodiments, the securing mechanism may comprise a shaft mounted to one of the cable-side body portion and the cabinet-side body portion, the shaft may be structurally configured to selectively engage a first engagement portion on the other of the cabinet-side body portion and the cable-side body portion to secure the connector in the cable installation position, and the shaft may be structurally configured to selectively engage a second engagement portion on the other of the cabinet-side body portion and the cable-side body portion to secure the connector in the angled position.

In particular embodiments, the first engagement portion may be a recess, and the second engagement portion may be a recess.

In particular embodiments, the securing mechanism may comprise a cabinet-side engaging portion on the cabinet-side swivel portion, and a cable-side engaging portion on the cable-side swivel portion, and the cabinet-side engaging portion may be structurally configured to contact the cable-side engaging portion to resist rotation of the cable-side swivel portion relative to the cabinet-side swivel portion.

In particular embodiments, one of the cabinet-side engaging portion and the cable-side engaging portion may comprise a plurality of protrusions extending from an internal groove in one of the cabinet-side portion and the cable-side portion, the other of the cabinet-side engaging portion and the cable-side engaging portion may comprise a plurality of flexible tabs extending from the other of the cabinet-side portion and the cable-side portion, the tabs may be structurally configured to contact the protrusions to resist rotation of the cable-side swivel portion relative to the cabinet-side swivel portion, and the tabs may be structurally configured to bend radially to permit the tabs to pass over the protrusions to permit the connector to move between the cable installation position and the angled position.

In particular embodiments, the cable-side swivel portion and the cabinet-side swivel portion may form an intermediate passageway that may be structurally configured to connect the passageway in the cabinet-side body portion and the passageway in the cable-side body portion.

In particular embodiments, a centerline of the passageway in the cabinet-side body portion may be offset from a centerline of the passageway in the cable-side body portion in the cable installation position.

Embodiments provide a connector for connecting a cable having a fiber to a cabinet in a manner that enhances feeding of the fiber through the connector, including: a first portion;

and a second portion. The first portion may be structurally configured to be rotatingly coupled with the second portion such that the first portion may be structurally configured to rotate relative to the second portion between a cable installation position and an angled position; passageways in the first portion and the second portion may be structurally configured to be positioned at a first angle relative to each other in the cable installation position; the passageways may be structurally configured to be positioned at a second angle relative to each other in the angled position; the first angle and the second angle may be different angles; a securing mechanism may be structurally configured to selectively secure the second portion to the first portion in the cable installation position and in the angled position; and the securing mechanism may be structurally configured to secure the first portion to the second portion in the cable installation position so as to enhance feeding of a fiber of the cable through the connector for connection of the cable to a cabinet.

In particular embodiments, the first portion may be a cabinet-side body portion, and the second portion may be a cable-side body portion.

In particular embodiments, the first portion may comprise a first swivel portion, and the second portion may comprise a second swivel portion.

In particular embodiments, the first portion and the second portion may be structurally configured such that a longitudinal axis of the passageway in the first portion and a longitudinal axis of the passageway in the second portion are parallel in the cable installation position.

In particular embodiments, the second angle may be ninety degrees.

In particular embodiments, the passageway in the first portion may extend through the first portion, and the passageway in the second portion may extend through the second portion.

In particular embodiments, the securing mechanism may comprise a shaft mounted to the first portion, the shaft may be structurally configured to selectively engage a first engagement portion on the second portion to secure the connector in the cable installation position, and the shaft may be structurally configured to selectively engage a second engagement portion on the second portion to secure the connector in the angled position.

In particular embodiments, the securing mechanism may comprise a first engaging portion on the first portion, and a second engaging portion on the second portion, and the first engaging portion may be structurally configured to contact the second engaging portion to resist rotation of the first portion relative to the second portion.

In particular embodiments, the first engaging portion may comprise a plurality of protrusions extending from an internal groove in the first portion, the second engaging portion may comprise a plurality of flexible tabs extending from the second portion, the tabs may be structurally configured to contact the protrusions to resist rotation of the first portion relative to the second portion, and the tabs may be structurally configured to bend radially to permit the tabs to pass over the protrusions to permit the connector to move between the cable installation position and the angled position.

Particular embodiments may further comprise an intermediate passageway that may be structurally configured to connect the passageway in the first portion and the passageway in the second portion.

In particular embodiments, a centerline of the passageway in the first portion may be offset from a centerline of the passageway in the second portion in the cable installation position.

Embodiments provide a connector for connecting a cable having a fiber to a cabinet in a manner that enhances feeding of the fiber through the connector, including: a first portion; and a second portion. The first portion may be structurally configured to be rotatingly coupled with the second portion; passageways in the first portion and the second portion may be structurally configured to be positioned at a first angle relative to each other in a first position; the passageways may be structurally configured to be positioned at a second angle relative to each other in a second position; the first angle and the second angle may be different angles; the passageways in the first portion and the second portion in the first position may be structurally configured so as to enhance feeding of a fiber of a cable through the connector for connection of the cable to a cabinet; and the first portion may be structurally configured to be secured to the second portion in the first position so as to enhance feeding of the fiber through the connector for connection of the cable to the cabinet.

In particular embodiments, the first portion may comprise a first swivel portion, and the second portion may comprise a second swivel portion.

In particular embodiments, the first portion and the second portion may be structurally configured such that a longitudinal axis of the passageway in the first portion and a longitudinal axis of the passageway in the second portion are parallel in the first position.

In particular embodiments, the second angle may be ninety degrees.

In particular embodiments, the securing mechanism may comprise a shaft mounted to the first portion, the shaft may be structurally configured to selectively engage a first engagement portion on the second portion to secure the connector in the first position, and the shaft may be structurally configured to selectively engage a second engagement portion on the second portion to secure the connector in the second position.

In particular embodiments, the securing mechanism may comprise a first engaging portion on the first portion, and a second engaging portion on the second portion, and wherein the first engaging portion may be structurally configured to contact the second engaging portion to resist rotation of the first portion relative to the second portion.

Particular embodiments further comprise an intermediate passageway that may be structurally configured to connect the passageway in the first portion and the passageway in the second portion.

In particular embodiments, a centerline of the passageway in the first portion may be offset from a centerline of the passageway in the second portion in the first position.

Various aspects of the system, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

Embodiments of the disclosure provide a connector having a securing mechanism that may be structurally configured to secure a first portion to a second portion in a cable installation position so as to enhance feeding of a fiber of a cable through the connector for connection of the cable to a cabinet.

Embodiments of the disclosure provide a connector that simplifies connection of a fiber optic cable/harness to a cabinet. In particular, embodiments simplify the feeding of optical fibers of the cable/harness through the connector that connects the cable/harness to the cabinet by providing a connector that rotates between a straight position and an angled (for example, ninety-degree) position.

Figure 1:
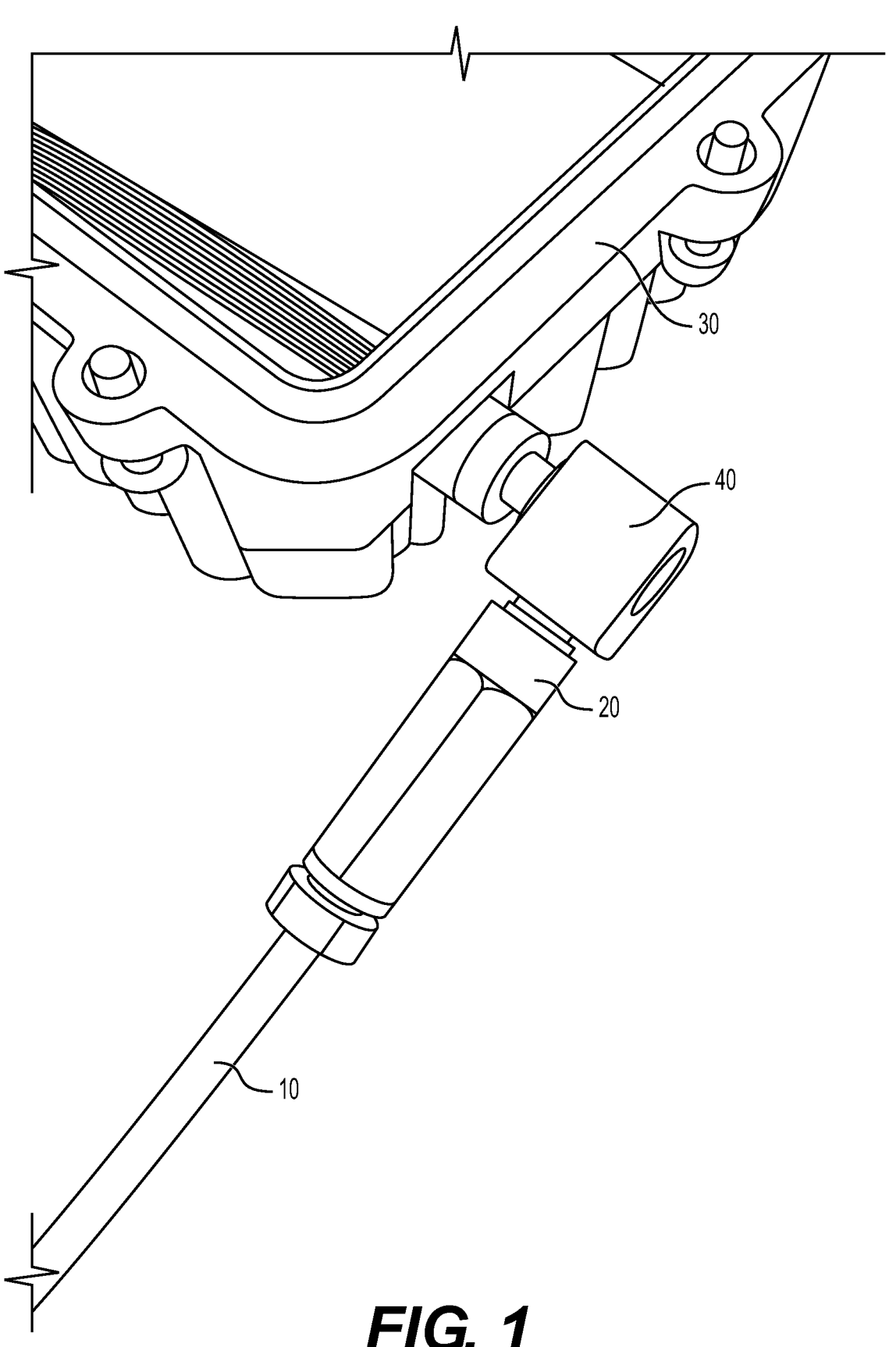
FIG. 1 shows a conventional node harness connector.
Figure 2:
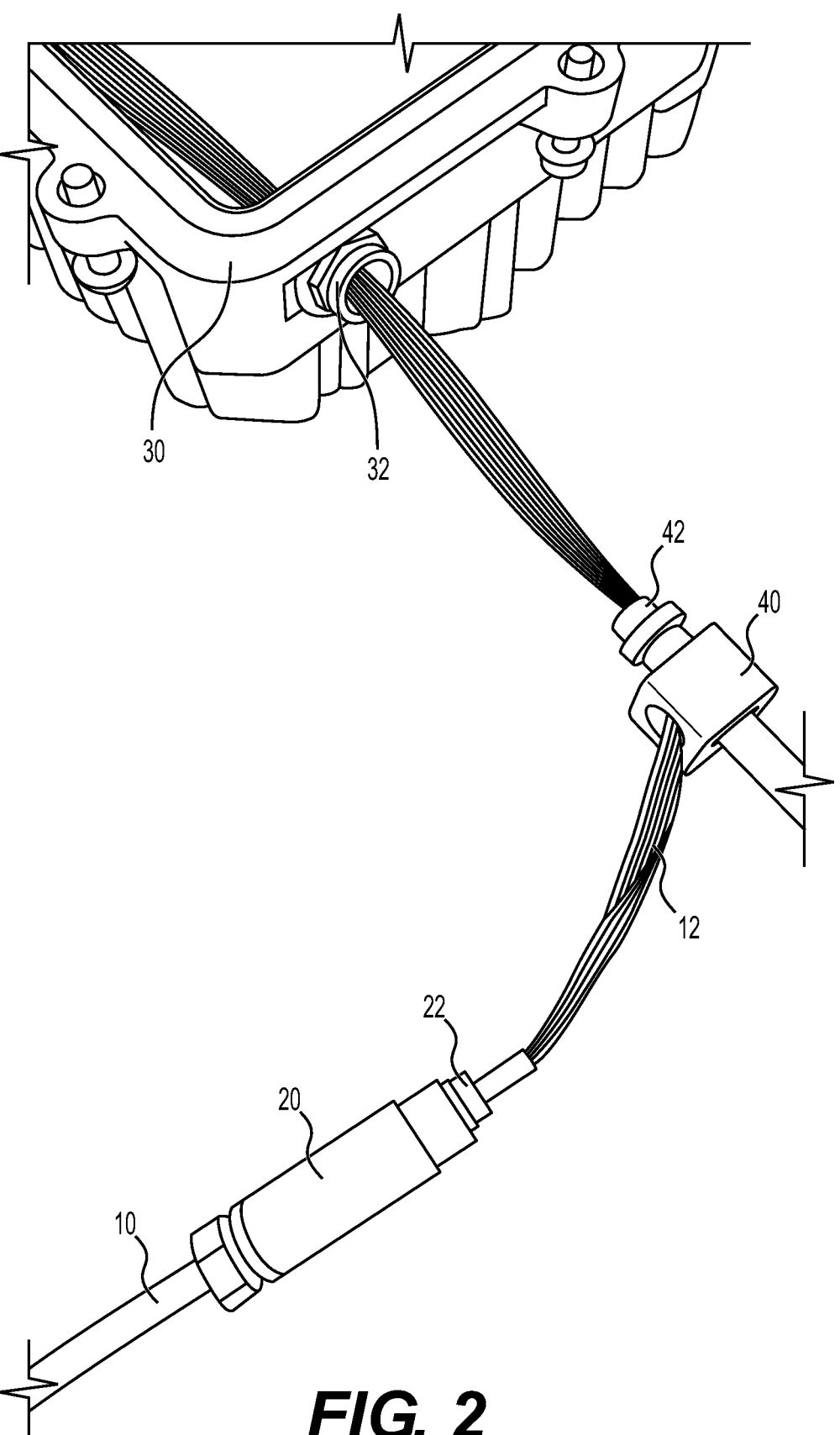
FIG. 2 shows the node harness connector of FIG. 1 in a semi-installed position.

FIGS. 1 and 2 show a conventional ninety-degree connector 40 for connecting a cable, for example, a fiber optic cable 10 to a cabinet 30. In this example, fiber optic cable 10 is connected to ninety-degree connector 40 by a connector 20. As shown in FIG. 2, fiber optic cable 10 includes a plurality of optical fibers 12 that extend through ninety-degree connector 40 and into cabinet 30. In practice, a threaded connection 22 of connector 20 is threaded into ninety-degree connector 40 and a threaded connection 432 of ninety-degree connector 40 is threaded into a port 32 on cabinet 30. Feeding optical fibers 12 through ninety-degree connector 40 can be difficult due to the need for optical fibers 12 to bend ninety degrees to pass through ninety-degree connector 40.

Figure 3:
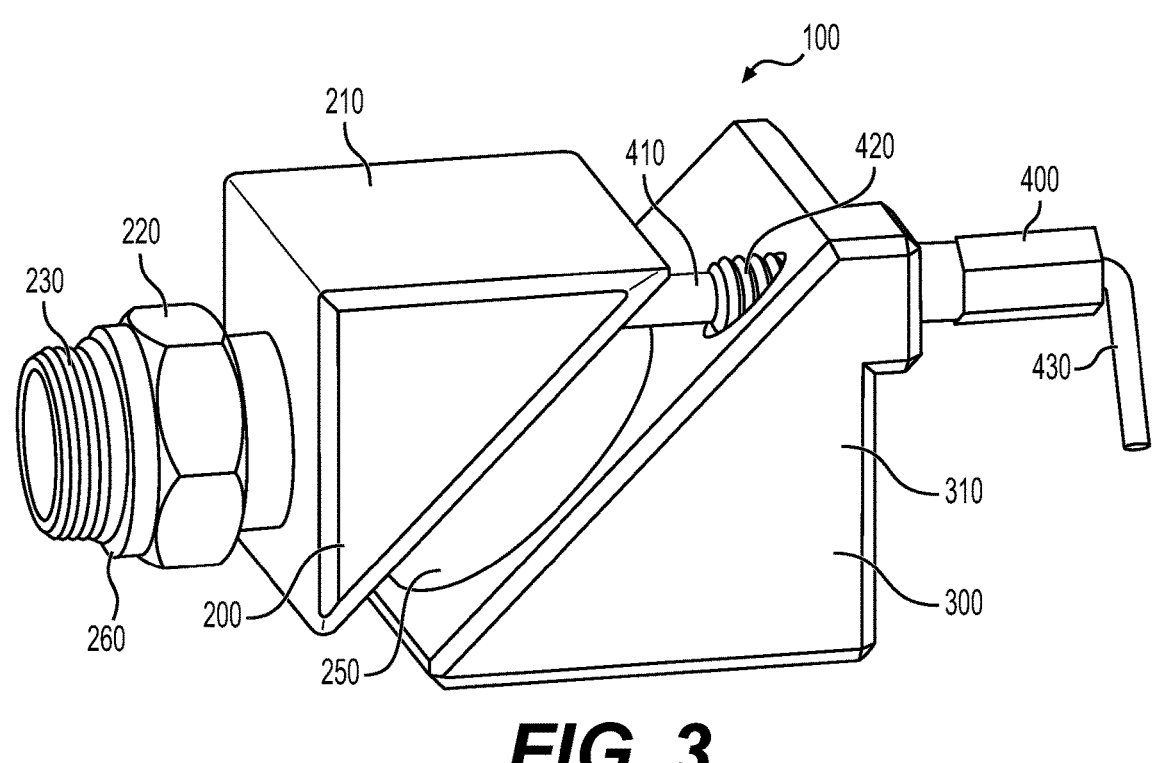
FIG. 3 is a perspective view of an exemplary node harness connector in accordance with various aspects of the disclosure.
Figure 4:
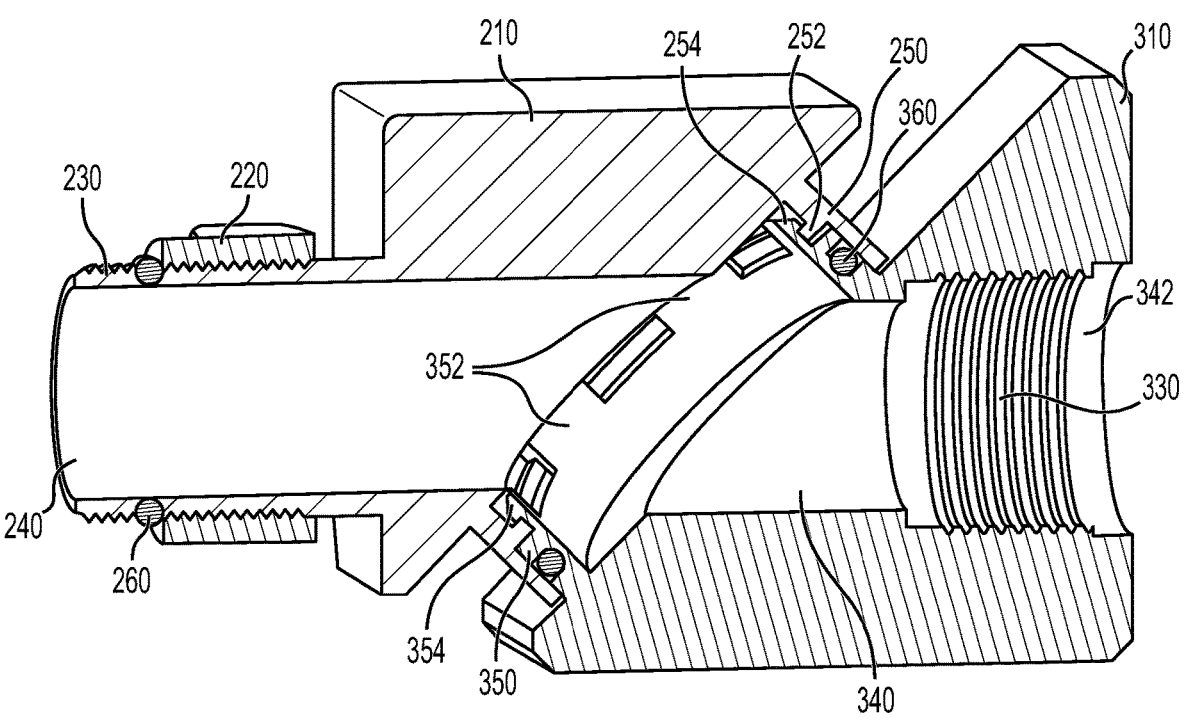
FIG. 4 is a sectional view of the node harness connector of FIG. 3 in a feed-through position.
Figure 5:
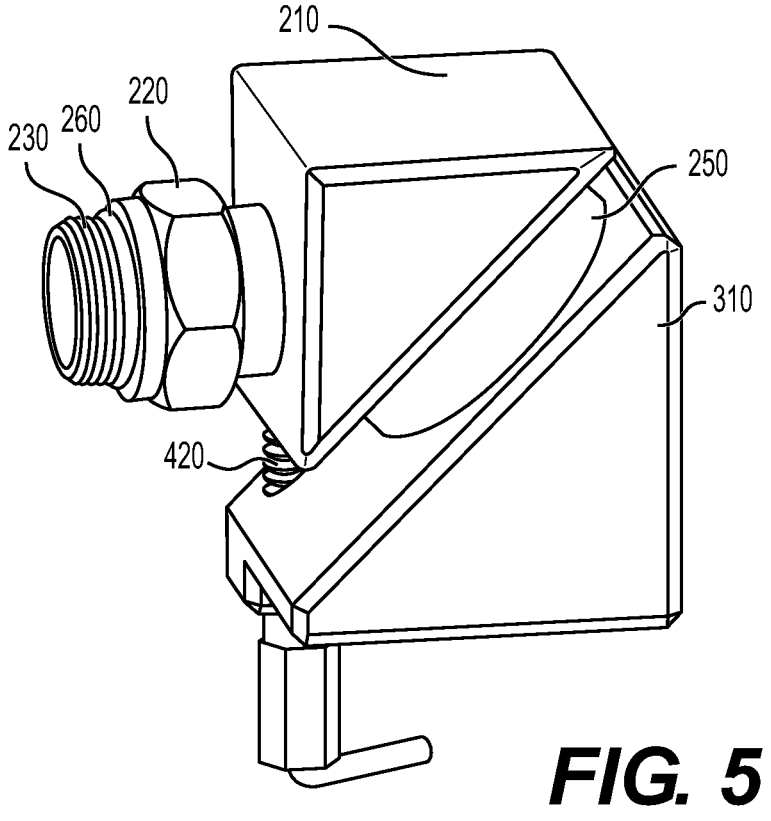
FIG. 5 is a perspective view of the node harness connector of FIG. 3 in a ninety-degree position.
Figure 6:
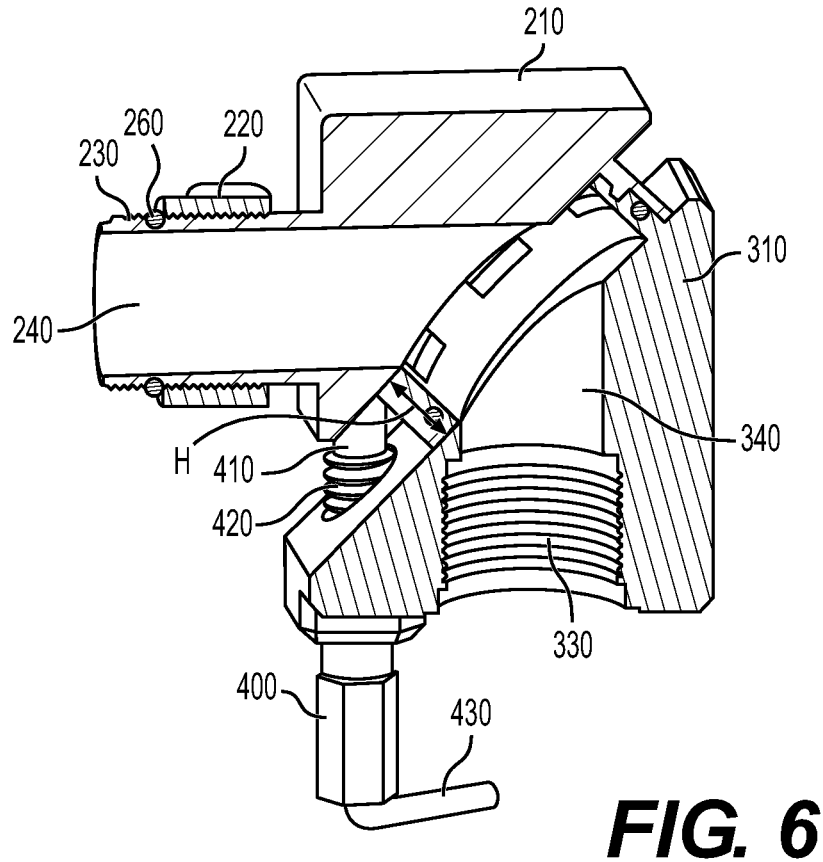
FIG. 6 is a sectional view of the node harness connector of FIG. 3 in a ninety-degree position.

Embodiments of the disclosure provide a solution to the difficulties resulting from the structure of a rigid ninety-degree connector such as connector 40 of FIGS. 1 and 2. FIGS. 3-6 show an exemplary connector 100 in accordance with embodiments of the disclosure. In this example, connector 100 is configured to swivel between a first position, for example, a straight position (as shown in FIGS. 3 and 4) and a second position, for example, an angled position (as shown in FIGS. 5 and 6). Connector 100 has a first portion, for example, a cabinet-side portion 200 that is configured to attach to a cabinet, and a second portion, for example, a cable-side portion 300 that is configured to attach to a fiber optic cable (harness).

Cabinet-side portion 200 has a main body 210 from which a first swivel portion, for example, a cabinet-side swivel portion 250 extends. Cable-side portion 300 has a main body 310 from which a second swivel portion, for example, a cable-side swivel portion 350 extends. Swivel portion 250 and swivel portion 350 are connected to each other such that swivel portion 250 rotates relative to swivel portion 350. This relative rotation permits main body 310 to swivel relative to main body 210, which moves main body 310 between the straight position shown in FIGS. 3 and 4 and the angled position shown in FIGS. 5 and 6. It is significantly easier for a user to thread the optical fibers through connector 100 when connector 100 is in the straight position shown in FIGS. 3 and 4 because the optical fibers do not need to be negotiated around a ninety-degree bend.

Cabinet-side portion 200 has a passageway 240 that extends from swivel portion 250 to a treaded connection portion 230. Threaded connection portion 230 is configured to be threaded into a mating connector on a cabinet to which connector 100 is to be attached. A nut 220 is threaded onto threaded connection portion 230 and is configured to compress an O-ring 260 between nut 220 and the mating connector on the cabinet to create a seal, such as, for example, a waterproof seal, between connector 100 and the cabinet. Nut 220 also creates a mechanically secure connection between connector 100 and the cabinet.

In this example, swivel portion 350 has a second engaging portion, for example a cable-side engaging portion or a plurality of tabs 352 that extend from swivel portion 350. In this example, each tab 352 has a barb 354 that extents outwardly from one of tabs 352. Swivel portion 250 has a groove 254 above a protrusion 252 that is configured to receive barbs 354. In embodiments, tabs 352 are resilient in that they are configured to bend inwardly as swivel portion 350 is inserted into swivel portion 250 and then spring outwardly as barbs 354 enter into groove 254, securing cabinet-side portion 200 to cable-side portion 300. Barbs 354 are configured to slide in groove 254 to permit cabinet-side portion 200 to rotate relative to cable-side portion 300 so that cable side portion 300 can rotate between the straight position shown in FIGS. 3 and 4 and the angled position shown in FIGS. 5 and 6. The example shown has an O-ring 360 that creates a seal between swivel portion 250 and swivel portion 350. In this example, main body 310 has a passageway 340 that extends from swivel portion 350 to an opening 342 that is configured to receive a connector on a fiber optic cable. A threaded connection portion 330 is, in this example, internal threads that are configured to receive the connector on the fiber optic cable.

FIG. 3 shows a securing mechanism 400 that is configured to secure connector 100 in the straight position shown in FIGS. 3 and 4 and in the angled position shown in FIGS. 5 and 6. In embodiments, securing mechanism includes a spring actuated mechanism, a screw mechanism, or some other type of securing mechanism. In the example shown in FIG. 3, securing mechanism 400 has a shaft 410, threads 420 on shaft 410, and a handle 430 that is configured to enable a user to rotate securing mechanism 400 from an engaged position to a disengaged position. To move securing mechanism 400 from the engaged position to the disengaged position requires the user to rotate shaft 410 to move shaft 410 away from main body 210 (to the right in FIG. 3). In this example, main body 310 has a passage 312 (FIGS. 6 and 7) that has internal threads that engage threads 420 of shaft 410. Other examples include a spring mounted to shaft 410 that is captured between shaft 410 and main body 310 to urge securing mechanism 400 into engagement with main body 210. In such sprung examples, a user disengages securing mechanism 400 from main body 210 by pulling handle 430 away from main body 210.

FIGS. 5 and 6 show connector 100 in an angled position in which passageway 240 and passageway 340 are positioned ninety degrees relative to one another. Comparing FIG. 6 to FIG. 4 shows that swivel portions 250 and 350 are engaged in both the straight position and the angled position. In the angled position shown in FIGS. 5 and 6, shaft 410 engages main body 210 in a different recess than it does in the straight position shown in FIGS. 3 and 4 (explained in more detail with reference to FIGS. 8 and 9).

FIG. 6 shows a passageway 390 between passageway 340 and passageway 240 having a height H. Height H of passageway 390 depends on the heights of swivel portion 250 and swivel portion 350. In embodiments, the length of passageway 340 is extended to provide an accommodate a heat shrink 13 (see FIG. 2) that is around the optical fibers and extends from an end of the cable connector 20. In some cases, heat shrink 13 can restrict bending to the point that connector 100 cannot be moved from the straight position to the angled position. A longer passageway 340 can prevent heat shrink 13 from entering passageway 390. In embodiments having a larger height H (for a given diameter of passageway 240 and a given diameter of passageway 340), the necessary bend radius of the optical fibers passing through connector 100 when connector 100 is in the angled position will be larger (which results in less stress on the optical fibers). Similarly, in embodiments having a smaller height H (for the given diameter of passageway 240 and the given diameter of passageway 340), the necessary bend radius of the optical fibers passing through connector 100 when connector 100 is in the angled position will be smaller (resulting in more stress on the optical fibers). Different heights H can cause different offsets of passageways 240 and 340 when connector 100 is in the straight position. As shown in FIG. 4, in this example, passageways 240 and 340 are offset slightly when connector 100 is in the straight position. Increasing height H in this example can result in a larger offset between passageways 240 and 340. It is noted that one or more of the location of passageways 240 and 340 within main bodies 210 and 310, the diameters of passageways 240 and 340, and height H can be varied to achieve a desired minimum bend radius of the optical fibers and a desired offset of passageways 240 and 340 (including zero).

In embodiments, a user performs the following steps: (1) the user inserts the harness into passageway 340, through passageway 390 and passageway 240, and into the cabinet while connector 100 is in the straight position; (2) the user threads treaded connection portion 230 into the cabinet; (3) the user rotates cable-side portion 310 to the angled position; and (4) the user threads the harness connector into threaded connection portion 330. The user can perform steps 1 and 2 in either order. In some applications, it might be easier for the user to install connector 100 onto the cabinet before inserting the harness into connector 100.

Figures 7, 8:
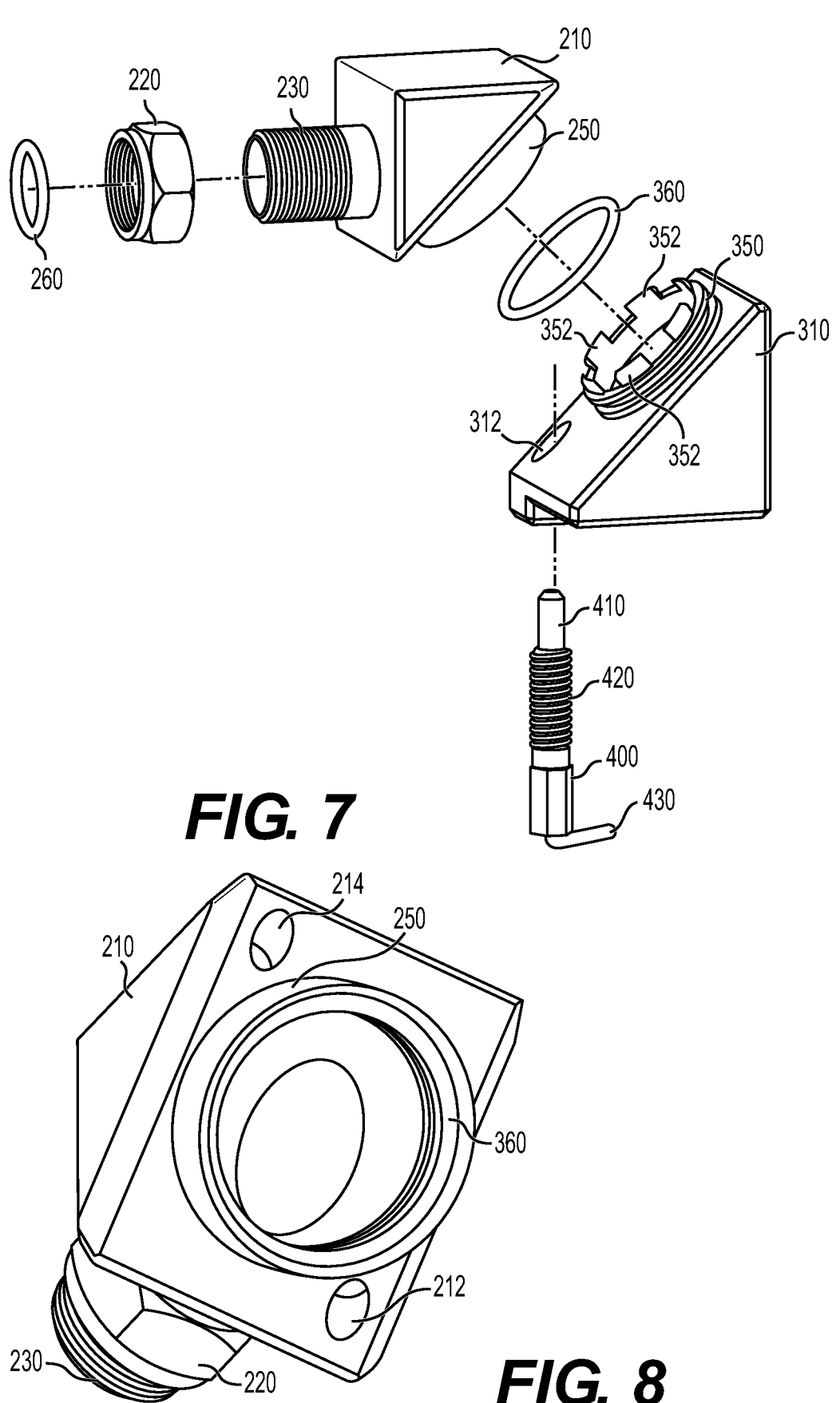
FIG. 7 is an exploded view of the node harness connector of FIG. 3 in a ninety-degree position.
FIG. 8 is a perspective view of a node-side portion of the node harness connector of FIG. 3.
Figures 9, 10:
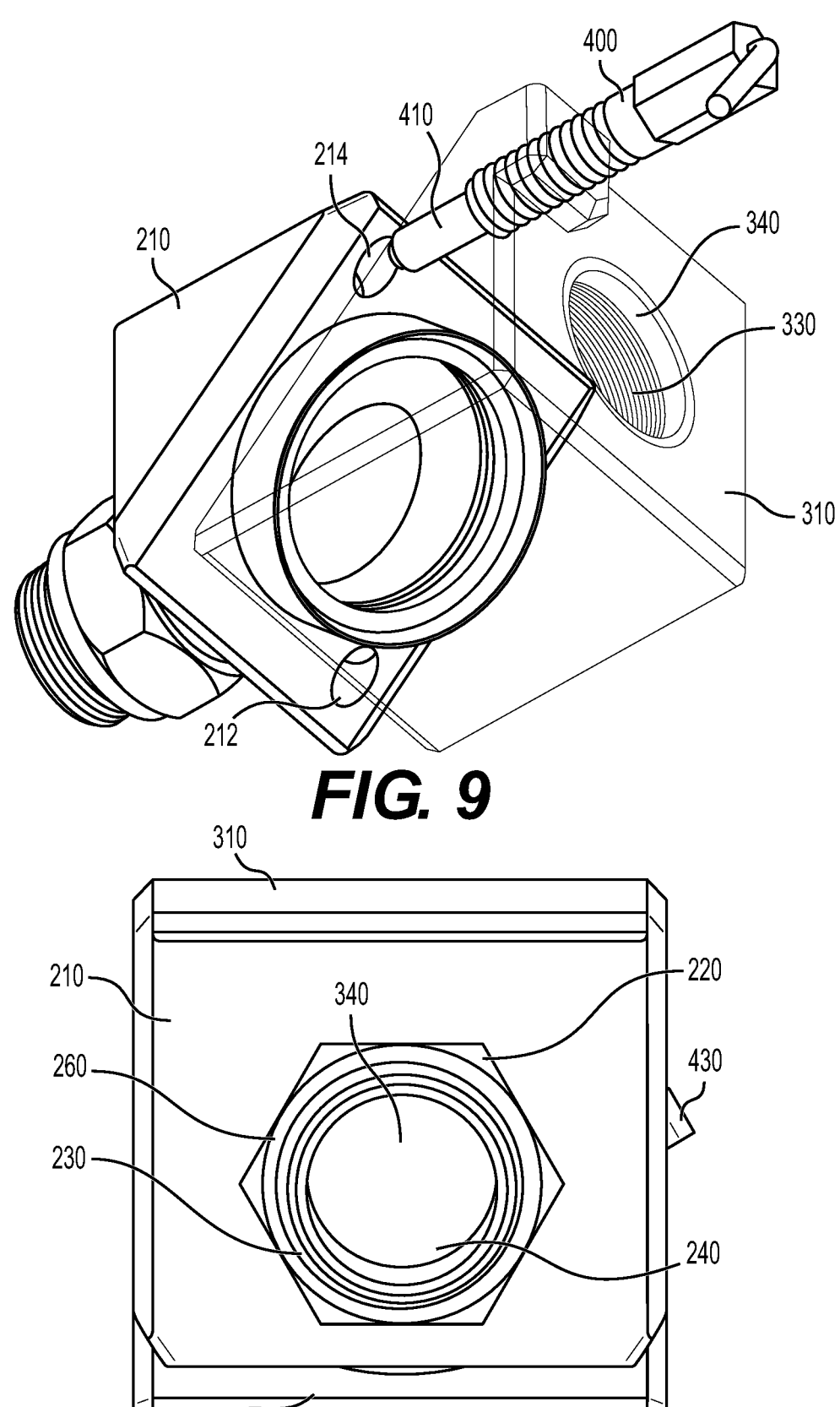
FIG. 9 is a partial transparent view of the node harness connector of FIG. 3 in a pass-through position.
FIG. 10 is an end view of the node harness connector of FIG. 3 in a feed-through position.

FIG. 7 is an exploded view of connector 100 and shows passage 312 in main body 310 that receives shaft 410 of securing mechanism 400. An end of shaft 410 is received in one of two recesses in main body 210 depending on whether connector 100 is in the straight position of the angled position. FIG. 8 shows an example of main body 210 having a second engagement portion, for example, a recess 212 for receiving shaft 410 in the angled position, and a first engagement portion, for example, a recess 214 for receiving shaft 410 in the starting position. FIG. 9 shows main body 310 in a transparent manner to more clearly show the interaction between shaft 410 and recess 214 when connector 100 is in the straight position. In FIG. 9, shaft 410 is shown in a position where shaft 410 aligns with recess 214, but is not inserted into recess 214. Main body 310 would be in the position shown in FIG. 9 when a user has installed the harness in connector 100 (for clarity, the harness is not shown), has moved securing mechanism 400 to a non-engaged position, and is ready to rotate main body 310 to the angled position relative to main body 210.

FIG. 10 is an end view of connector 100 in the straight position. As shown in FIG. 10, when connector 100 is in the straight position and no harness is installed in connector 100, passageways 240 and 340 at least partially align. In some embodiments, including the embodiment shown in FIG. 10, centerlines of passageways 240 and 340 are not colinear, but are parallel (also seen in FIG. 4). Passageways 240 and 340 having non-colinear centerlines can be a result of an offset caused by the height H of passageway 390 (see FIG. 6).

Figure 11:
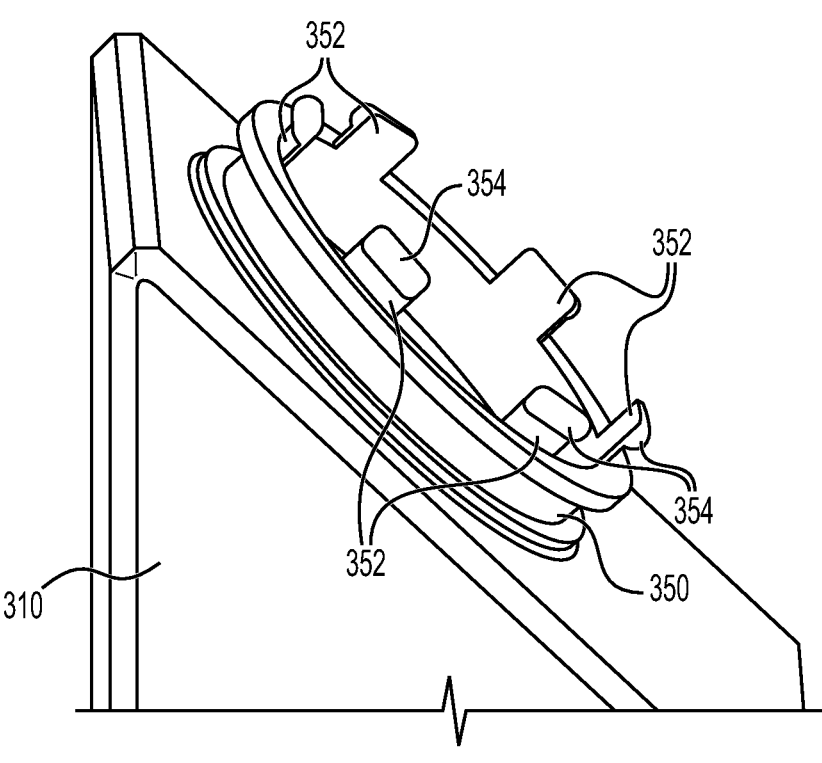
FIG. 11 is a partial perspective view of a harness-side portion of an alternate embodiment of a node harness connector in accordance with various aspects of the disclosure.
Figure 12:
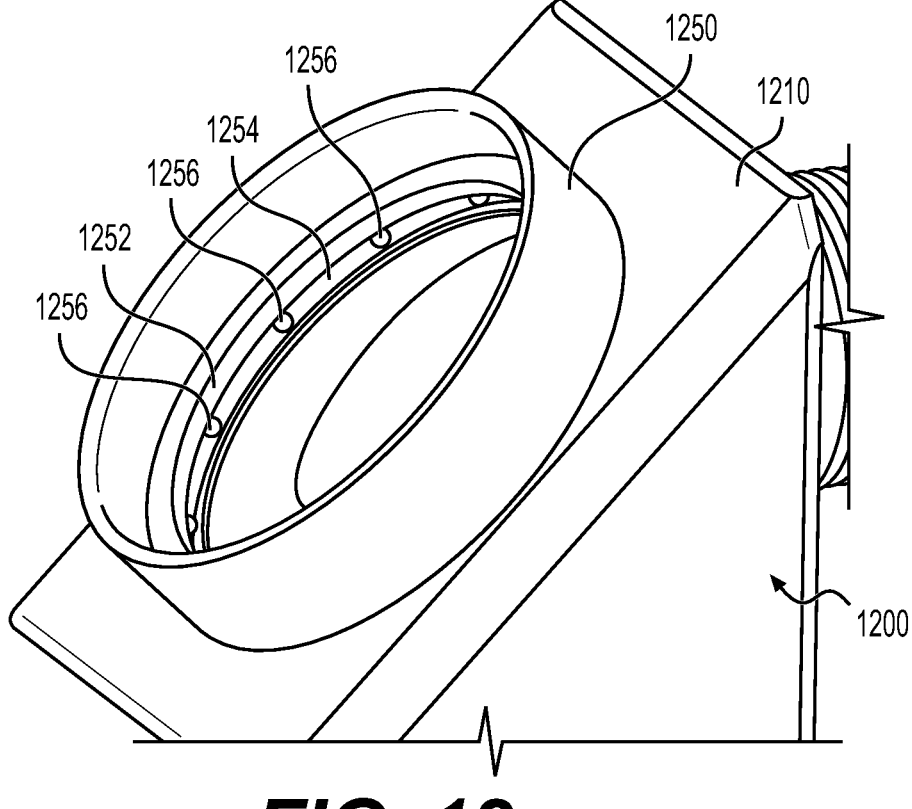
FIG. 12 is a partial perspective view of a node-side portion that corresponds to the harness-side portion of FIG. 11.
Figure 13:
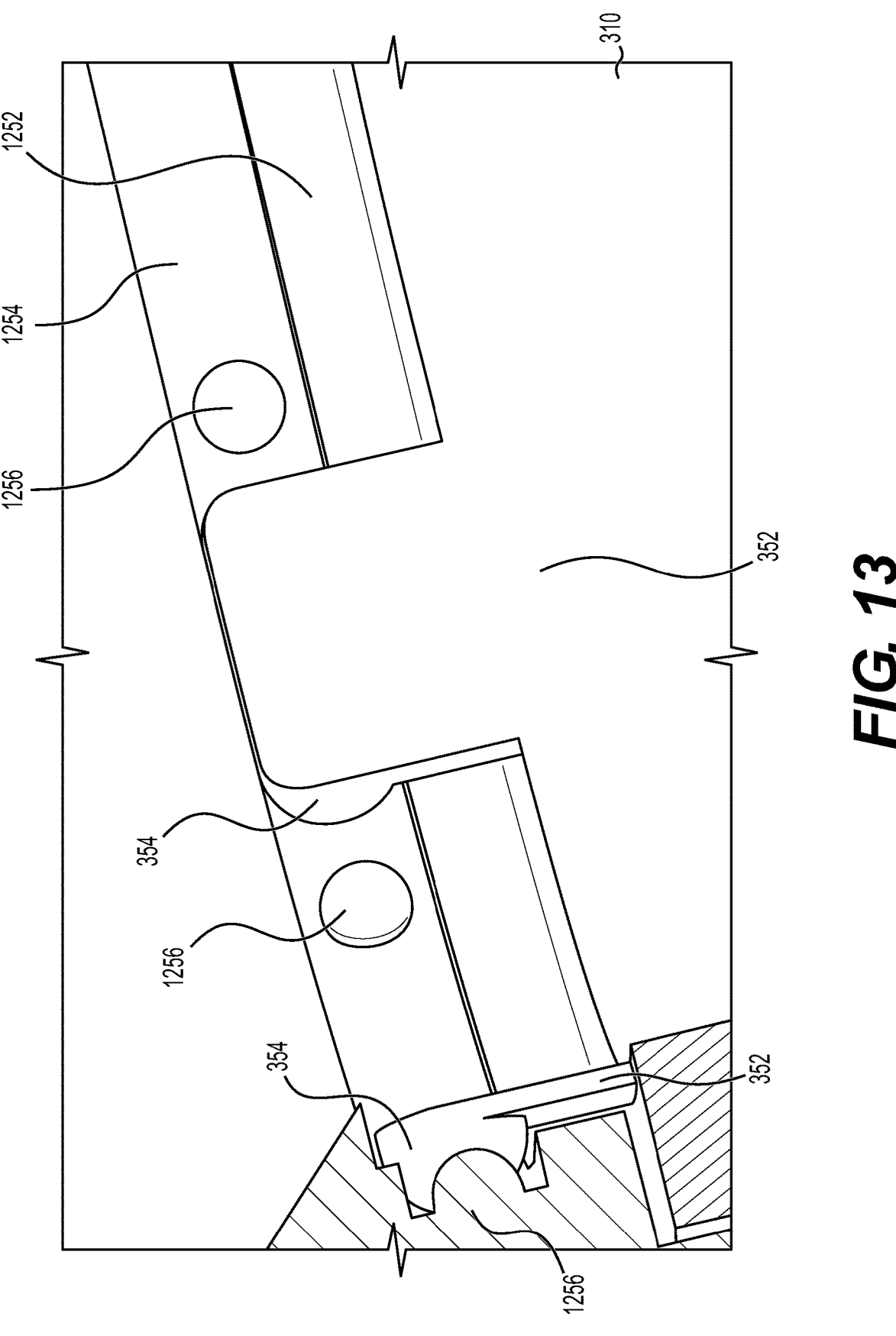
FIG. 13 is a partial magnified view of an interaction between the harness-side portion of FIG. 11 and the node-side portion of FIG. 12.

An alternate embodiment is shown in FIGS. 11-13. The embodiment of FIGS. 11-13 does not include securing mechanism 400, but, instead, includes a feature in the swivel joint that helps maintain connector 100 in the straight position and one or more angled positions.

FIG. 11 shows main body 310 having the same configuration shown in FIGS. 3-7. FIG. 12 shows a cabinet-side portion 1200 having a main body 1210 that is similar to main body 210 except that: (1) main body 1210 does not have recesses 212 and 214 (shown in FIG. 8) because this embodiment does not include securing mechanism 400; and (2) main body 1210 has a swivel portion 1250 instead of swivel portion 250. Swivel portion 1250 has a groove 1254 that extends around in inner surface of swivel portion 1250. A plurality of engaging portions, for example, cabinet-side engaging portions or protrusions 1256 extend inward radially from groove 1254. In this example, protrusions 1256 are hemispherical bumps. In other embodiments, protrusions 1256 are shapes other than hemispherical and/or are different sizes relative to groove 1254. In other embodiments, fewer or more of protrusions 1256 are provided.

FIG. 13 shows barbs 354 of tabs 352 that extend from swivel portion 350 engaging groove 1254 between two protrusions 1256. As described above, in embodiments, tabs 352 are resilient in that they are configured to bend inwardly as swivel portion 350 is inserted into swivel portion 1250 and then spring outwardly as barbs 354 enter into groove 1254, securing cabinet-side portion 1200 to cable-side portion 300. Barbs 354 are configured to slide in groove 1254 to permit cabinet-side portion 1200 to rotate relative to cable-side portion 300 so that cable side portion 300 can rotate between the straight position shown in FIGS. 3 and 4 and the angled position shown in FIGS. 5 and 6. When a user rotates cable-side portion 300 relative to cabinet-side portion 1200, barbs 354 contact protrusions 1256. Further rotational force applied by the user causes tabs 352 to bend radially inward due to the interaction between barbs 354 and protrusions 1256. In embodiments, ends of barbs 354 are rounded or ramped so that contact with protrusions 1256 eases tabs 352 radially inward. The exemplary embodiment shown in FIGS. 11-13 provides resistance to rotation of main body 210 relative to main body 310, while also allowing such rotation when force is applied by a user, without the need for securing mechanism 400.

The above exemplary embodiments provide a harness/cabinet ninety-degree connector for fiber optic cables/harnesses that simplifies the insertion of a cable/harness through the connector and into the cabinet.

Although the above exemplary embodiments are directed to a ninety-degree connector, the same features can be applied to a connector that rotates between two angles other than zero degrees (straight) and ninety-degrees.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A connector for connecting a fiber optic cable having an optical fiber to a cabinet in a manner that allows feeding of the optical fiber through the connector, comprising:
   a cabinet-side body portion;
   a cable-side body portion;
   wherein the cabinet-side body portion comprises a cabinet-side swivel portion;
   wherein the cable-side body portion comprises a cable-side swivel portion;
   wherein the cable-side swivel portion is structurally configured to be rotatingly coupled with the cabinet-side swivel portion such that the cable-side body portion is structurally configured to rotate relative to the cabinet-side body portion between a cable installation position and an angled position;
   wherein a passageway in the cabinet-side body portion and a passageway in the cable-side body portion are structurally configured to be positioned at a first angle relative to each other in the cable installation position;
   wherein the passageway in the cabinet-side body portion and the passageway in the cable-side body portion are structurally configured to be positioned at a second angle relative to each other in the angled position;
   wherein the first angle and the second angle are different angles;
   wherein the passageways are structurally configured to receive a continuous fiber simultaneously extending through the first passageway and the second passageway in both the cable installation position and the angled position;
   wherein a securing mechanism is structurally configured to selectively secure the cable-side body portion to the cabinet-side body portion in the cable installation position and in the angled position; and
   wherein the securing mechanism is structurally configured to secure the cable-side body portion to the cabinet-side body portion in the cable installation position so as to allow feeding of optical fibers of the fiber optic cable through the connector for connection of the fiber optic cable to a cabinet.

2. The connector of claim 1, wherein the cable-side body portion and the cabinet-side body portion are structurally configured such that a longitudinal axis of the passageway in the cabinet-side body portion and a longitudinal axis of the passageway in the cable-side body portion are parallel in the cable installation position.

3. The connector of claim 1, wherein the second angle is ninety degrees.

4. The connector of claim 1, wherein the cabinet-side body portion comprises a cabinet connection portion that is structurally configured to connect to a cabinet.

5. The connector of claim 1, wherein the cable-side body portion comprises a cable connection portion that is structurally configured to connect to a cable.

6. The connector of claim 1, wherein the passageway in the cabinet-side body portion extends through the cabinet-side body portion, and the passageway in the cable-side body portion extends through the cable-side body portion.

7. The connector of claim 1, wherein the securing mechanism comprises a shaft mounted to one of the cable-side body portion and the cabinet-side body portion, the shaft is structurally configured to selectively engage a first engagement portion on the other of the cabinet-side body portion and the cable-side body portion to secure the connector in the cable installation position, and the shaft is structurally configured to selectively engage a second engagement portion on the other of the cabinet-side body portion and the cable-side body portion to secure the connector in the angled position.

8. The connector of claim 7, wherein the first engagement portion is a recess, and the second engagement portion is a recess.

9. The connector of claim 1, wherein the securing mechanism comprises a cabinet-side engaging portion on the cabinet-side swivel portion, and a cable-side engaging portion on the cable-side swivel portion, and wherein the cabinet-side engaging portion is structurally configured to contact the cable-side engaging portion to resist rotation of the cable-side swivel portion relative to the cabinet-side swivel portion.

10. The connector of claim 9, wherein one of the cabinet-side engaging portion and the cable-side engaging portion comprises a plurality of protrusions extending from an internal groove in one of the cabinet-side portion and the cable-side portion,
   wherein the other of the cabinet-side engaging portion and the cable-side engaging portion comprises a plurality of flexible tabs extending from the other of the cabinet-side portion and the cable-side portion,
   wherein the tabs are structurally configured to contact the protrusions to resist rotation of the cable-side swivel portion relative to the cabinet-side swivel portion, and
   wherein the tabs are structurally configured to bend radially to permit the tabs to pass over the protrusions to permit the connector to move between the cable installation position and the angled position.

11. The connector of claim 1, wherein the cable-side swivel portion and the cabinet-side swivel portion form an intermediate passageway that is structurally configured to connect the passageway in the cabinet-side body portion and the passageway in the cable-side body portion.

12. The connector of claim 1, wherein a centerline of the passageway in the cabinet-side body portion is offset from a centerline of the passageway in the cable-side body portion in the cable installation position.

13. A connector for connecting a cable having a fiber to a cabinet in a manner that allows feeding of the fiber through the connector, comprising:
   a first portion;
   a second portion;
   wherein the first portion is structurally configured to be rotatingly coupled with the second portion such that the first portion is structurally configured to rotate relative to the second portion between a cable installation position and an angled position;

wherein passageways in the first portion and the second portion are structurally configured to be positioned at a first angle relative to each other in the cable installation position;

wherein the passageways are structurally configured to be positioned at a second angle relative to each other in the angled position;

wherein the first angle and the second angle are different angles;

wherein the passageways are structurally configured to receive a continuous fiber simultaneously extending through the first passageway and the second passageway in both the cable installation position and the angled position;

wherein a securing mechanism is structurally configured to selectively secure the second portion to the first portion in the cable installation position and in the angled position; and wherein the securing mechanism is structurally configured to secure the first portion to the second portion in the cable installation position so as to allow feeding of a fiber of the cable through the connector for connection of the cable to a cabinet.

14. The connector of claim 13, wherein the first portion is a cabinet-side body portion, and the second portion is a cable-side body portion.

15. The connector of claim 13, wherein the first portion comprises a first swivel portion, and the second portion comprises a second swivel portion.

16. The connector of claim 13, wherein the first portion and the second portion are structurally configured such that a longitudinal axis of the passageway in the first portion and a longitudinal axis of the passageway in the second portion are parallel in the cable installation position.

17. The connector of claim 13, wherein the second angle is ninety degrees.

18. The connector of claim 13, wherein the passageway in the first portion extends through the first portion, and the passageway in the second portion extends through the second portion.

19. The connector of claim 13, wherein the securing mechanism comprises a shaft mounted to the first portion, the shaft is structurally configured to selectively engage a first engagement portion on the second portion to secure the connector in the cable installation position, and the shaft is structurally configured to selectively engage a second engagement portion on the second portion to secure the connector in the angled position.

20. The connector of claim 13, wherein the securing mechanism comprises a first engaging portion on the first portion, and a second engaging portion on the second portion, and wherein the first engaging portion is structurally configured to contact the second engaging portion to resist rotation of the first portion relative to the second portion.

21. The connector of claim 20, wherein first engaging portion comprises a plurality of protrusions extending from an internal groove in the first portion, wherein the second engaging portion comprises a plurality of flexible tabs extending from the second portion, wherein the tabs are structurally configured to contact the protrusions to resist rotation of the first portion relative to the second portion, and wherein the tabs are structurally configured to bend radially to permit the tabs to pass over the protrusions to permit the connector to move between the cable installation position and the angled position.

22. The connector of claim 13, further comprising an intermediate passageway that is structurally configured to connect the passageway in the first portion and the passageway in the second portion.

23. The connector of claim 13, wherein a centerline of the passageway in the first portion is offset from a centerline of the passageway in the second portion in the cable installation position.

24. A connector for connecting a cable having a fiber to a cabinet in a manner that allows feeding of the fiber through the connector, comprising:

a first portion;

a second portion;

wherein the first portion is structurally configured to be rotatingly coupled with the second portion;

wherein passageways in the first portion and the second portion are structurally configured to be positioned at a first angle relative to each other in a first position;

wherein the passageways are structurally configured to be positioned at a second angle relative to each other in a second position;

wherein the first angle and the second angle are different angles;

wherein the passageways are structurally configured to receive a continuous fiber simultaneously extending through the first passageway and the second passageway in both the first position and the second position;

wherein the passageways in the first portion and the second portion in the first position are structurally configured so as to allow feeding of a fiber of a cable through the connector for connection of the cable to a cabinet; and wherein the first portion is structurally configured to be secured to the second portion in the first position so as to allow feeding of the fiber through the connector for connection of the cable to the cabinet.

25. The connector of claim 24, wherein the first portion comprises a first swivel portion, and the second portion comprises a second swivel portion.

26. The connector of claim 24, wherein the first portion and the second portion are structurally configured such that a longitudinal axis of the passageway in the first portion and a longitudinal axis of the passageway in the second portion are parallel in the first position.

27. The connector of claim 24, wherein the second angle is ninety degrees.

28. The connector of claim 24, wherein the securing mechanism comprises a shaft mounted to the first portion, the shaft is structurally configured to selectively engage a first engagement portion on the second portion to secure the connector in the first position, and the shaft is structurally configured to selectively engage a second engagement portion on the second portion to secure the connector in the second position.

29. The connector of claim 24, wherein the securing mechanism comprises a first engaging portion on the first portion, and a second engaging portion on the second portion, and wherein the first engaging portion is structurally configured to contact the second engaging portion to resist rotation of the first portion relative to the second portion.

30. The connector of claim 24, further comprising an intermediate passageway that is structurally configured to connect the passageway in the first portion and the passageway in the second portion.

31. The connector of claim 24, wherein a centerline of the passageway in the first portion is offset from a centerline of the passageway in the second portion in the first position.

\* \* \* \* \*